Nov. 1, 1932.  L. AZARRAGA  1,885,102

CAMERA

Filed Jan. 27, 1931   2 Sheets-Sheet 1

INVENTOR
LUIS AZARRAGA.
BY ATTORNEY

Nov. 1, 1932.     L. AZARRAGA     1,885,102
CAMERA
Filed Jan. 27, 1931     2 Sheets-Sheet 2
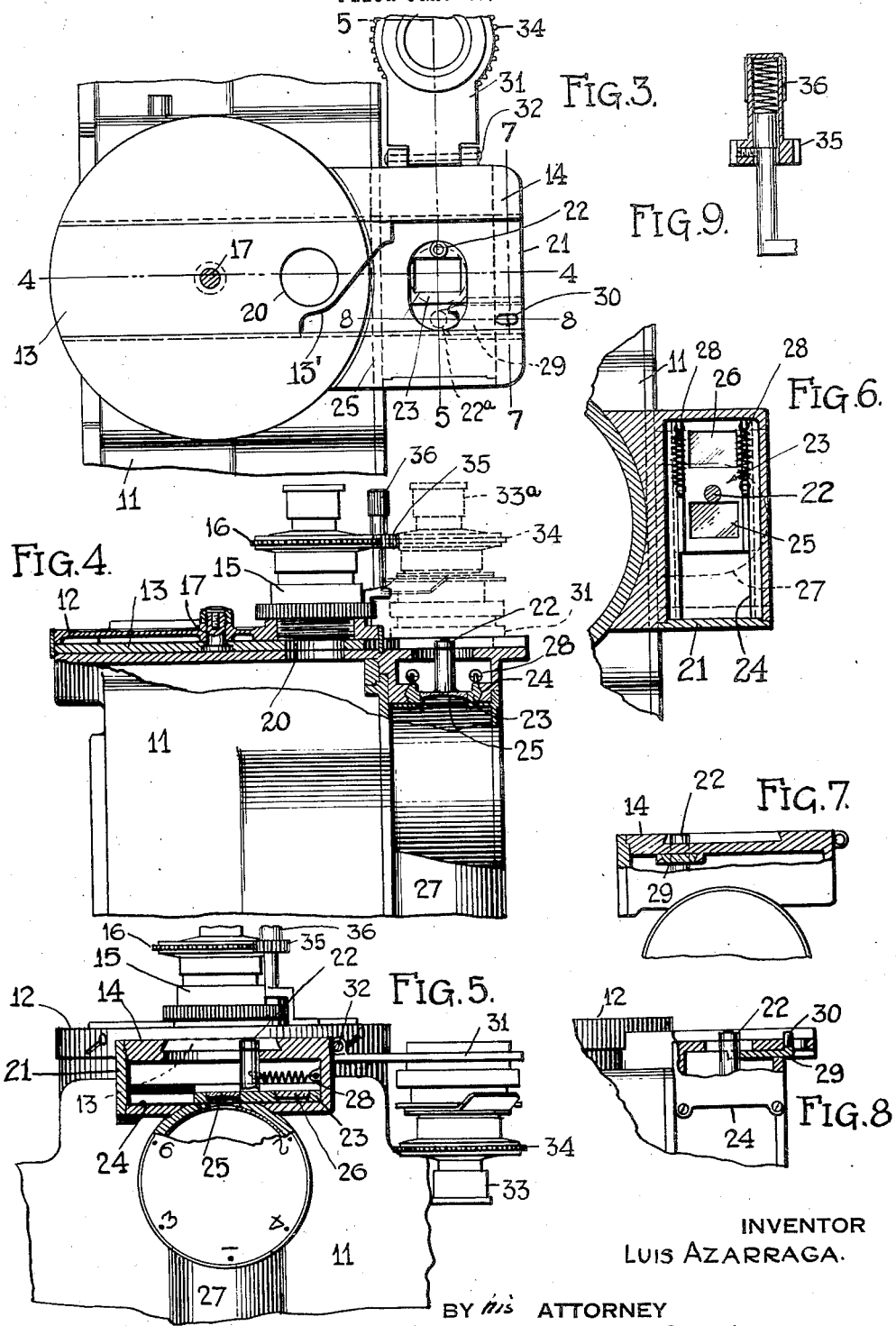
INVENTOR
LUIS AZARRAGA.
BY his ATTORNEY Patented Nov. 1, 1932

1,885,102

UNITED STATES PATENT OFFICE

LUIS AZARRAGA, OF HEMPSTEAD, NEW YORK

CAMERA

Application filed January 27, 1931. Serial No. 511,544.

My invention relates to cameras and more particularly to motion picture cameras equipped with one or more lenses in a focusing mount. The invention is especially adapted for use as a means for focusing motion picture cameras and of accurately setting up on the particular object or objects which it is desired to photograph.

The usual methods of focusing motion picture cameras are cumbersome and inaccurate as well as requiring considerable time. In the single lens type it is customary to use a separate view finder to locate the object which it is desired to photograph, and then set the lens focus by means of the graduated focusing mount, using a measure to determine the distance to the object or else merely estimating this distance. This method is inaccurate because the view finder does not cover the same field as the lens, and the focus is poor because of poor distance estimation, or requires considerable time if accurately measured.

Cameras which are equipped with the so-called turret head, permitting of rapid change from one mounted lens to another, are even more susceptible to focusing difficulties and are highly inefficient. Various means of sighting and focusing are at present furnished in such cameras. One method is to sight thru a peep-hole in the side of the camera casing or box, and focus thru the film. This is awkward and unsatisfactory as it is necessary to locate the object thru a ninety degree (90°) system of prisms which materially hinder the operator (because of his sidewise position) in setting his camera so as to include what is desired in the picture.

A further method of focusing a turret head camera, as now practiced, is to revolve the turret until the desired lens is in a predetermined position, then slide the camera casing into focusing position, so that the focusing aperture and the lens coincide. A reversal of this process is then necessary in order to get the camera casing back in its original position and the turret correctly located for filming. It is obvious that this rotation of the turret and sliding of the camera casing is a long process and susceptible of throwing the lens out of focus due to the amount of handling that is necessary. Furthermore, the rotation of the turret as a step in the focusing operation, destroys the true relation of the lens axis and the film, and gives a focus which is not made in accordance with the correct operating position of these two essential parts, so that such a focus may appear correct to the operator, but in reality be incorrect for the actual relationship of the lens axis and film in the operative position of the camera.

An object of the present invention is to provide a motion picture camera focusing means which will give accurate results and enable its use in a shorter time than is required by any means heretofore employed.

A further object of the invention is to simplify the construction of such focusing means so as to render it more or less foolproof.

A further object of the invention is to enable any type of motion picture camera to focus thru the identical lens that is to be used in taking the picture.

A further object of the invention is to keep the relation of the lens axis to the ground glass field the same as the relation of the lens axis to the film, and thus prevent the unavoidable inaccuracies heretofore encountered.

A still further object of the invention is to present the field covered by the lens in such a way as to enable rapid location of the object desired.

Other and further objects and advantages of the invention will be hereinafter more fully set forth.

In the drawings, wherein like reference characters denote like or corresponding parts, Fig. 1 is a side view of a turret head motion picture camera embodying my invention;

Fig. 3 is a partial front view of the camera with the turret head removed;

Fig. 4 is a section on the line 4—4 of Fig. 3;

Fig. 5 is a section on the line 5—5 of Fig. 3;

Fig. 6 is a view partly in section of the view finder and ground glass slide with the cover plate removed;

Fig. 7 is a section on the line 7—7 of Fig. 3;

Fig. 8 is a section on the line 8—8 of Fig. 3, and

Fig. 9 is a cross section of the intermediate idler gear and spindle shown in Figs. 4 and 5.

Figure 1:
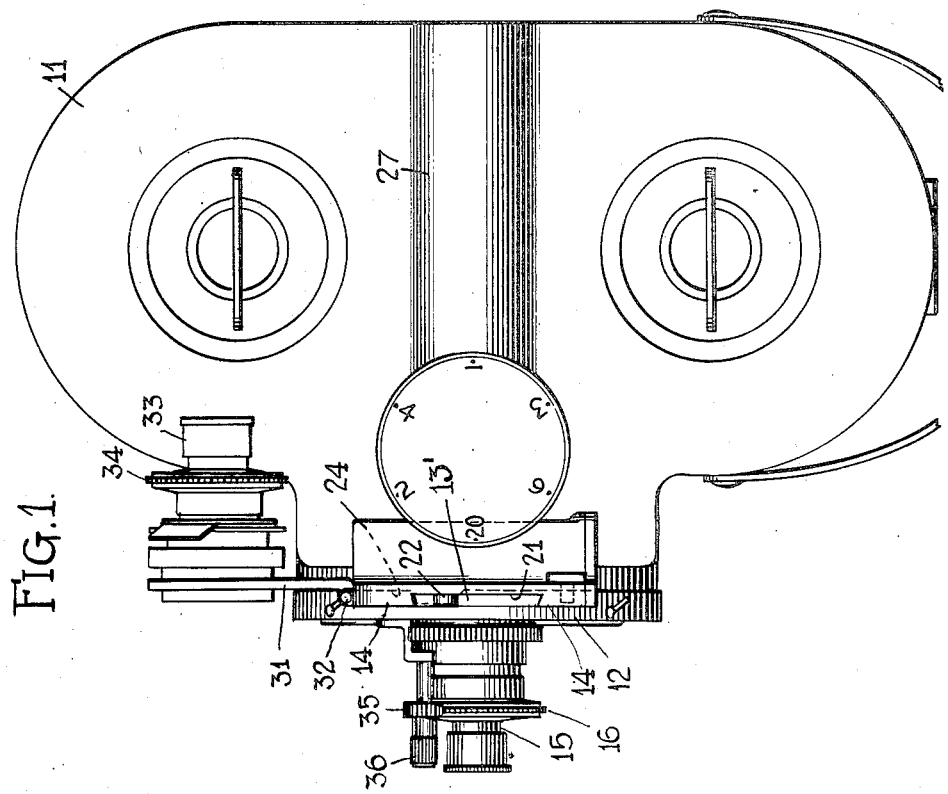

In the embodiment of the invention selected for illustration I have shown in Fig. 1 a conventional motion picture camera 11 equipped with a turret head 12 which is mounted on a slide 13 and is capable of being moved transversely across the front of the camera along a track or guideway 14. The turret head 12 (as shown) has one lens 15 mounted in a focusing mount 16.

Figure 2:
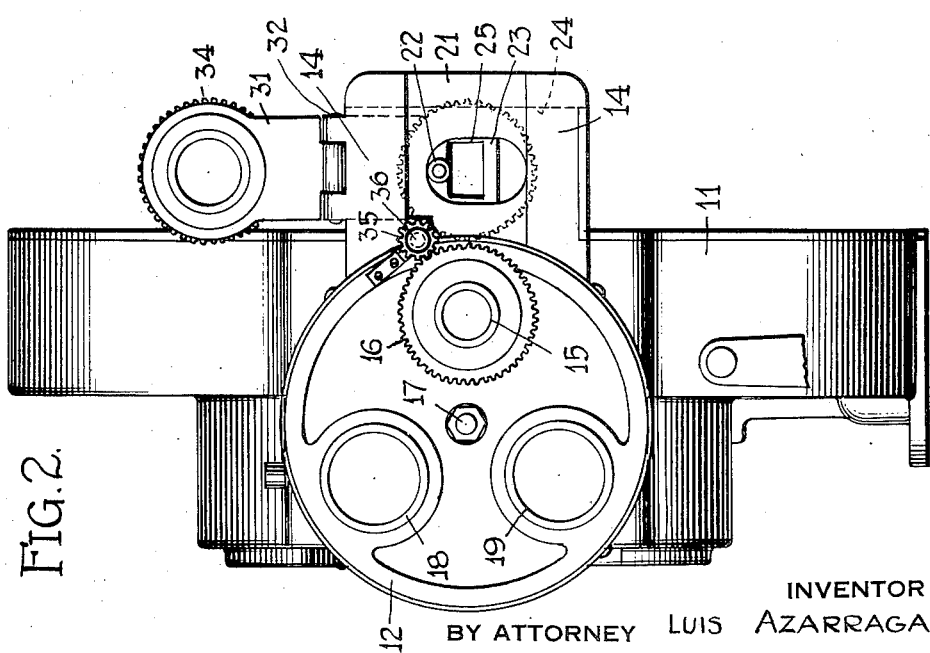
Fig. 2 is a front view.

Fig. 2 shows the lens 15 so positioned about the revolving turret 12 as to be correctly located for taking pictures. The turret 12 may be revolved about the pin 17 so as to bring additional mounts 18 and 19 into the position in which the lens 15 is shown. Additional lenses may obviously be placed in the mounts 18 and 19 as desired.

In Fig. 3 it will be seen that the slide 13 has a hole or opening 20 in it in such position that the lens selected for filming is in line with said hole. The slide 13 is provided with an irregular contour or cam surface 13′ on its end adjacent to the view finder mechanism, which said mechanism, as illustrated, is enclosed in a compartment 21. When the slide 13 is moved toward the finder mechanism, this irregular contour or cam surface 13′ engages a pin 22 and moves said pin to the position 22a (Fig. 3). Pin 22 is part of slide 23 which is capable of being moved vertically along the track 24 as indicated in Figs. 3, 4, 5, and 6. Said slide carries an ordinary view finder lens 25 and a ground glass 26. Where the slide is in the position shown by the pin 22 in Fig. 3, the usual eye telescope 27 (see Fig. 1) is lined up with the lens 25 and may be used as a visual view finder. When the slide 23 is moved downward by the motion of the cam surface 13′ at the end of the slide 13, the ground glass 26 is brought into the position formerly occupied by the lens 25 directly in back of the hole or opening 20.

In as much as any lens on turret head 12 can be rotated over the hole 20 and the unit consisting of lens, turret head and slide moved over in front of the view finder, it is readily understood that an image of the lens field is projected on the ground glass 26 which has automatically moved from behind the lens selected. The lens selected, (lens 15) can thus be focused by means of its focusing mount 16 so that the operator secures a correct image on the ground glass 26 as seen thru the telescope 27.

When a correct focus is obtained, the lens-turret-slide assembly is moved back to its original position for filming. As the slide 13 is moved back, the springs 28 (Fig. 6) return the slide 23 to the position in which the visual finder is again operative. If for any reason it is desired to lock the ground glass 26 in its lowered position, it may be held thus positioned by means of a lever catch 29 actuated by a pin 30, said catch engaging the pin 22 in its lower position when the pin 30 is pushed in its slot (see Figs. 3, 7, and 8).

The holding down of the ground glass 20 makes it possible to focus thru the telescope 27 when the camera is in operation. This is accomplished by means of an auxiliary lens holder 31 which permits lens 33 to be swung about the hinge 32 so as to occupy the position 33a shown in Fig. 4. If both lens 15 and lens 33 have been set to a predetermined and equal focus stop, it will be seen that sighting thru the telescope 27 onto the ground glass 26 will permit lens 33 to be correctly focused by means of its focusing mount 34, and that thru idler gear 35 the lens 15 will be correspondingly correctly focused because of the meshing of its focusing mount gear 16 with the idler gear. Lenses 33 and 15 must be matched for this operation. In order to facilitate the meshing of the gear train 34, 35 and 16, when the holder 31 is swung down in place, the idler gear 35 is mounted on a slidable spindle 36 so as to enable it to be moved aside until the gears 34 and 16 are properly aligned.

It is apparent from the foregoing that the slide 23 containing ground glass 26 must be so located that the ground glass is positioned rearwardly of the lens in focusing position in a manner to correspond exactly with the position of the lens and film when the lens is in filming position. This will result in a correct focus being obtained. Moreover, in as much as turret 12 may be rotated at any time, it is readily seen that all of the lenses in the turret may be focused for a given camera position while the lens-turret-slide assembly is in focusing position.

Not only does the invention assure an accurate focus thru the identical lens that is to be used in taking the picture, but it enables any or all lenses to be focused quickly and with no chance of the focus being altered in placing the lense back in filming position. Also it allows the operator to view the object in a natural position as one would in merely looking at the object visually. A further advantage of the invention is that it allows all sighting, focusing and framing to be done thru one and the same aperture.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a camera, the combination of a view finder including a view finder lens, a ground glass, a slide within which both the view finder lens and the ground glass are mounted, a camera lens movable from an operative position at one side of to a different operative position in line with the view finder, and means operable simultaneously with the movement of said camera lens to move said slide and by such movement shift the view finder lens and the ground glass either into or out of operative position.

2. In a camera, the combination, of a view finder including a view finder lens, a ground glass, a slide within which both the view finder lens and the ground glass are mounted, a camera lens movable from an operative position at one side of to a different operative position in line with the view finder, a cam surface operable to move said slide in one direction simultaneously with the movement of said camera lens toward said view finder, and a spring operable to move said slide in the opposite direction as said camera lens is oppositely moved, the movement of said slide being adapted to alternately move the view finder lens and the ground glass either into or out of operative position depending upon the adjusted position of the camera lens.

3. In a camera, the combination, of a view finder, a camera lens mounted at one side of the view finder, a focusing mount for said lens, an auxiliary lens movable from an inoperative position at one side of to an operative position over one end of the view finder, a focusing mount for said auxiliary lens, and means establishing an interconnection between said focusing mounts when said auxiliary lens is moved to its operative position.

4. In a camera, the combination, of a view finder, a camera lens mounted at one side of the view finder, a focusing mount for said lens including a gear, an auxiliary lens movable from an inoperative position at one side of to an operative position over one end of the view finder, a focusing mount for said auxiliary lens including a gear, and an idler gear with which the gear of the focusing mount of said camera lens and with which the gear of the focusing mount of the auxiliary lens is adapted to mesh when said auxiliary lens is moved to its operative position.

5. In a camera, the combination, of a view finder including a view finder lens, a ground glass, a slide within which both the view finder lens and the ground glass are mounted, a camera lens movable from an operative position at one side of to a different operative position in line with the view finder, means operable simultaneously with the movement of said camera lens to move said slide and by such movement shift the view finder lens and the ground glass into or out of operative position, a focusing mount for said camera lens, an auxiliary lens movable from an inoperative position at one side of to an operative position over one end of the view finder, means for holding said slide with the view finder lens out of operative position during such time as the auxiliary lens is held in operative position, a focusing mount for said auxiliary lens, and an interconnection between said focusing mounts adapted to be established when said auxiliary lens is moved to its operative position.

6. In a camera, the combination, of a view finder including a movable view finder lens, a camera lens mount, a camera lens carried by said mount and movable therewith from an operative position at one side of to a different operative position in line with the view finder, and means operable simultaneously with the movement of said camera lens to move said view finder lens into and out of operative position.

7. In a camera, the combination, of a view finder including a movable view finder lens, a camera lens mount, a camera lens carried by said mount and movable therewith from an operative position at one side of to a different operative position in line with the view finder, and means actuated by said mount upon movement thereof to move said view finder lens into and out of operative position.

In testimony whereof I hereunto affix my signature.

LUIS AZARRAGA.